Sheet 1 - 2 Sheets.
C. Wheeler Jr.
Mower.
No. 879 Reissued. Jan. 3, 1860.
Re 879
CLASSIFICATION
PATENTS
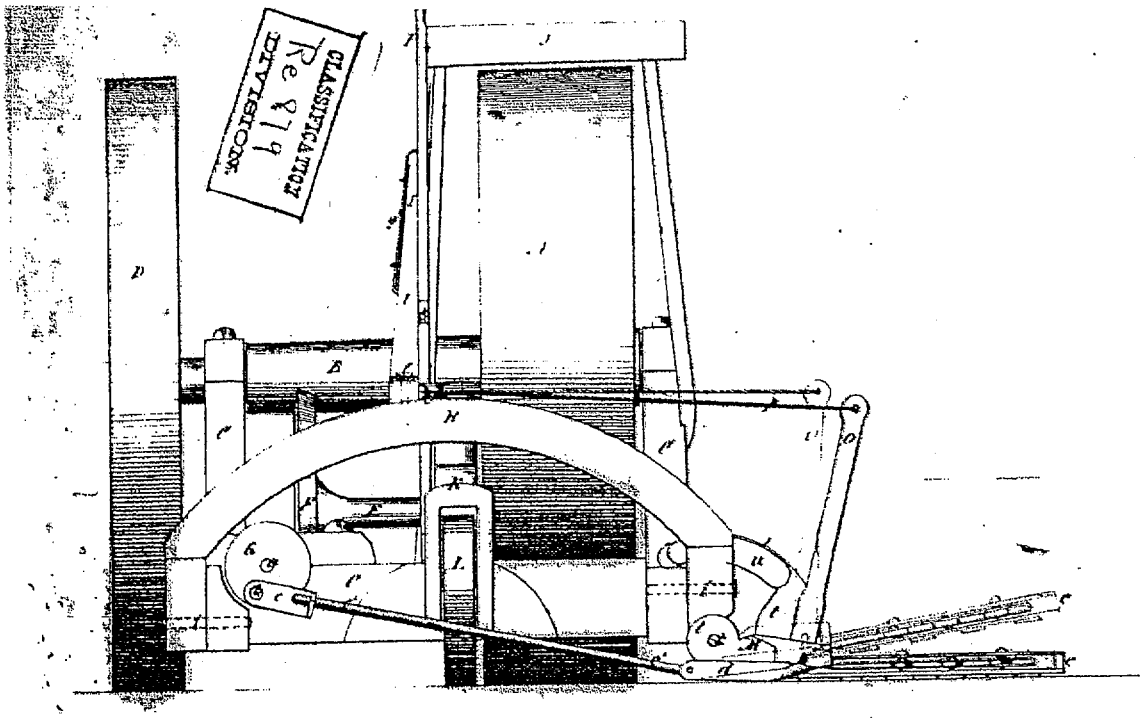
Fig. 2.
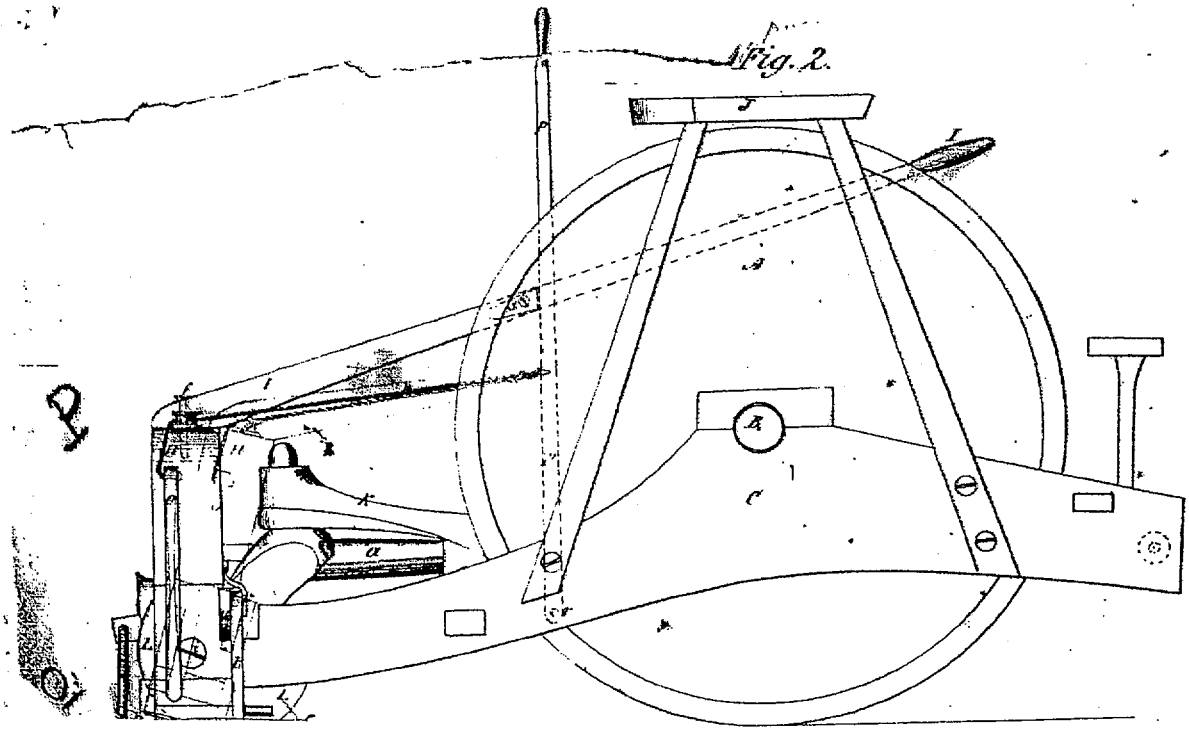

Sheet 2. 2 Sheets.
C. Wheeler Jr.
Mower.
No. 879 Reissued. Jan. 3, 1860.
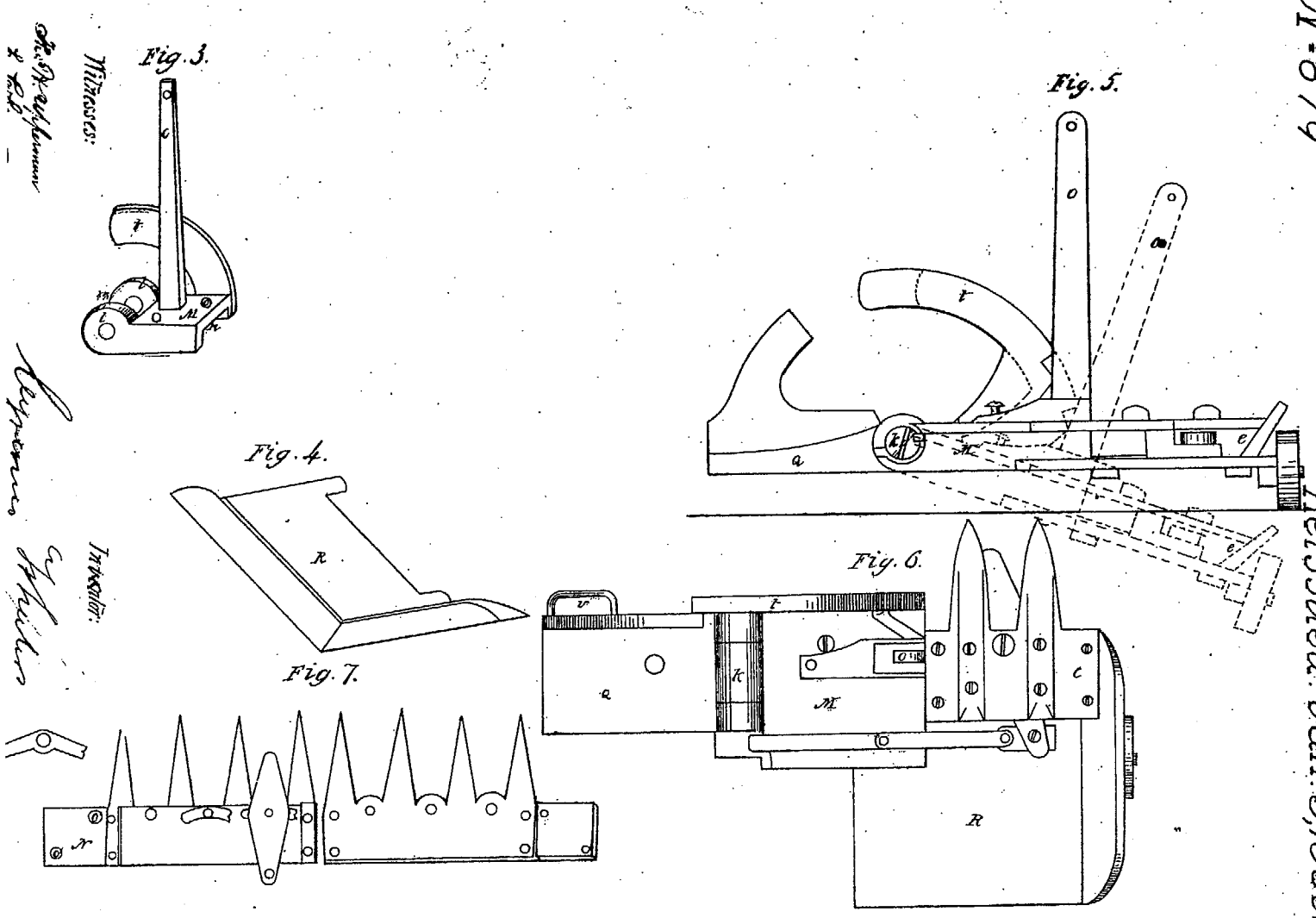
Witnesses:
R. M. Offerman
& Co.
Inventor:
C. Wheeler

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 879, dated January 3, 1860.

DIVISION E.

*To all whom it may concern:*

Be it known that I, CYRENUS WHEELER, JR., of Poplar Ridge, in the county of Cayuga and State of New York, have invented certain new and useful Improvements in Grain and Grass Harvesters; and I do hereby declare the following to be a full, clear, and exact description of the same, reference being had to the accompanying drawings, making a part of this specification, in which—

Figure 1 represents a rear elevation of the machine. Fig. 2 represents an elevation from that side of a harvesting-machine that runs next the standing crop. Figs. 3 and 4 represent detached portions thereof. Figs. 5 and 6 represent on an enlarged scale a rear elevation and a plan of a finger-bar and shoe hinged together, and Fig. 7 represents a cutting apparatus.

Similar letters of reference, where they occur in the separate drawings, denote like parts of the machine in all of them.

To make a grain or grass harvester whose finger-bar is so connected to the main frame as to have two motions independent of said main frame—that is to say, one motion above and below the plane of the path over which the supporting or driving-wheels are passing, and another motion which raises up or depresses the points of the fingers—requires an arrangement of hinged or pivoted connections of peculiar relation to each other and to the main frame, so that one shall not influence or be influenced in any injurious manner by the other. To effect this purpose is the object of this part of my invention; and my invention consists in combining with a cutter-bar and its hinge, and a supporting piece or brace and its hinged connection with the main frame, the placing of the pivots of said hinges at right angles to each other and in or near the line of the finger-bar.

To enable others skilled in the art to make and use this invention, I will proceed to describe the same with reference to the drawings.

A represents a main driving and supporting wheel on the axle B, and fast thereon so as to turn with it, and D is an auxiliary supporting-wheel.

C is a main frame supported in any of the well-known ways upon the axle B.

To that end of the main frame to which the cutting apparatus is to be connected I connect a bar, brace, or support, H, by means of pivots *i i*, so that it may swing around this hinged point as a center, and to the piece H is hinged a shoe, M, Figs. 1, 3, the pivot *k* of this hinge standing at right angles to the pivots *i* that form the first-described hinged connection. The cutter-bar is rigidly bolted to this shoe M. The arranging of the pivots *i k* of the two hinged connections at right angles to each other makes a sort of compound movement almost equivalent to a universal joint, as the piece H may be swung into any of its varied positions, and then the finger-bar can swing at right angles to that position.

Having thus fully described the nature and object of my invention, what I claim under this patent is—

In combination with a cutter-bar, the shoe M and its hinge, and a supporting-piece and its hinged connection to the main frame, the arranging of the pivots of said hinges at right angles to each other and in or near the line of the finger-bar, as described.

CYRENUS WHEELER, JR.

Witnesses:
THOS. H. UPPERMAN,
E. COHEN.